US012617282B2

(12) United States Patent
Armstrong

(10) Patent No.: US 12,617,282 B2
(45) Date of Patent: May 5, 2026

(54) VEHICLE USER INTERFACE CONTROL SYSTEM AND METHOD

(71) Applicant: JAGUAR LAND ROVER LIMITED, Warwickshire (GB)

(72) Inventor: Alan Armstrong, Whitley (GB)

(73) Assignee: JAGUAR LAND ROVER LIMITED, Whitley (GB)

( * ) Notice: Subject to any disclaimer, the term of this patent is extended or adjusted under 35 U.S.C. 154(b) by 0 days.

(21) Appl. No.: 18/850,114

(22) PCT Filed: Mar. 22, 2023

(86) PCT No.: PCT/EP2023/057329
§ 371 (c)(1),
(2) Date: Sep. 24, 2024

(87) PCT Pub. No.: WO2023/180382
PCT Pub. Date: Sep. 28, 2023

(65) Prior Publication Data
US 2025/0222768 A1      Jul. 10, 2025

(30) Foreign Application Priority Data
Mar. 24, 2022    (GB) ..................................... 2204180

(51) Int. Cl.
*B60K 35/233*        (2024.01)
*B60K 35/10*        (2024.01)
(Continued)

(52) U.S. Cl.
CPC ............ *B60K 35/233* (2024.01); *B60K 35/10* (2024.01); *B60K 35/22* (2024.01); *B60K 35/235* (2024.01);
(Continued)

(58) Field of Classification Search
CPC ...... B60K 35/233; B60K 35/10; B60K 35/22; B60K 35/235; B60K 35/28; B60K 35/29;
(Continued)

(56) References Cited

U.S. PATENT DOCUMENTS 11,175,876  B1 *  11/2021  Tseng ........................ G06N 3/09
2018/0032300  A1 *   2/2018  Singh ..................... B60K 35/10
(Continued)

FOREIGN PATENT DOCUMENTS

GB            2566611  A        3/2019

OTHER PUBLICATIONS

International Search Report and Written Opinion of the International Searching Authority for International application No. PCT/EP2023/057329 dated Aug. 2, 2023.
(Continued)

*Primary Examiner* — Douglas Wilson
(74) *Attorney, Agent, or Firm* — Carlson, Gaskey & Olds, P.C.

(57)            ABSTRACT

The present disclosure relates to a control system (200), to a vehicle (1), to a method (400), and to computer software (208). The method (400) is a method of controlling a user interface of a vehicle (1). The method (400) comprises obtaining (402) context information associated with use of the vehicle. The method (400) comprises providing (402) the context information to a dynamic decision model to determine (404) a display location at which to display a user interface item (502-518) on at least one of a plurality of driver-viewable displays (216, 218, 220) at different locations relative to a front windscreen (2) of the vehicle. The method (400) comprises causing (406) the user interface item (502-518) to be displayed at the determined display location. The method (400) comprises updating (410, 412, 414) the dynamic decision model in dependence on the
(Continued)

context information and a determined user response to the display location of display of the user interface item (502-518).

20 Claims, 3 Drawing Sheets

(51) Int. Cl.

| | |
|---|---|
| *B60K 35/22* | (2024.01) |
| *B60K 35/235* | (2024.01) |
| *B60K 35/28* | (2024.01) |
| *B60K 35/29* | (2024.01) |
| *B60K 35/80* | (2024.01) |
| *G06F 3/14* | (2006.01) |
| *B60K 35/65* | (2024.01) |

(52) U.S. Cl.
CPC .............. *B60K 35/28* (2024.01); *B60K 35/29* (2024.01); *B60K 35/80* (2024.01); *B60K 35/65* (2024.01); *B60K 2360/11* (2024.01); *B60K 2360/148* (2024.01); *B60K 2360/1523* (2024.01); *B60K 2360/164* (2024.01); *B60K 2360/166* (2024.01); *B60K 2360/182* (2024.01); *B60K 2360/184* (2024.01); *B60K 2360/186* (2024.01); *G06F 3/1423* (2013.01)

(58) Field of Classification Search
CPC ........ B60K 2360/148; B60K 2360/164; B60K 2360/166; B60K 2360/182; B60K 2360/186; B60K 35/80; B60K 35/65; B60K 2360/184; B60K 2360/731; B60K 2360/1438; B60K 2360/1523; B60K 2360/146; B60K 2360/11; B60K 2360/143; B60K 2360/1526; B60K 35/213; B60K 2360/77; B60K 2360/785; B60K 2360/788; G06F 3/1423
See application file for complete search history.

(56)     References Cited

U.S. PATENT DOCUMENTS

| | | | |
|---|---|---|---|
| 2019/0155560 A1 | 5/2019 | Huang et al. | |
| 2021/0078608 A1* | 3/2021 | Misu ........................ | G06N 7/01 |
| 2021/0334565 A1 | 10/2021 | Roche et al. | |

OTHER PUBLICATIONS

Examination Report under Section 18(3) for Application No. GB2204180.0 dated Jan. 26, 2024.
Search Report under Section 17 for Application No. GB2204180.0 dated Sep. 21, 2022.

* cited by examiner

VEHICLE USER INTERFACE CONTROL SYSTEM AND METHOD

TECHNICAL FIELD

The present disclosure relates to a control system and method for controlling a user interface of a vehicle. In particular, but not exclusively it relates to a control system, a vehicle, a method, and computer software, for determining display locations of various user interface items, to optimise display.

BACKGROUND

As displays increasingly replace physical HMI switchgear and analogue instruments, there is increased flexibility over which user interfaces are displayed on which displays of the vehicle. If the user interfaces are not optimised, users of the vehicle may find that it takes undesirable effort to locate the desired functionality.

SUMMARY OF THE INVENTION

It is an aim of the present invention to address one or more of the disadvantages associated with the prior art.

Aspects and embodiments of the invention provide a control system, a vehicle, a method, and computer software as claimed in the appended claims.

According to an aspect of the invention there is provided a control system for controlling a user interface of a vehicle, the control system comprising one or more controllers, the control system configured to:

obtain context information associated with use of the vehicle;

provide the context information to a dynamic decision model to determine a display location at which to display a user interface item on at least one of a plurality of driver-viewable displays at different locations relative to a front windscreen of the vehicle;

cause the user interface item to be displayed at the determined display location; and update the dynamic decision model in dependence on at least one of:

the context information; or a determined user response to the display location and/or timing of display of the user interface item.

An advantage is reducing the complexity of the system. A further advantage is to reduce undesirable effort for the user to locate the desired functionality. The control system determines the optimal display locations of user interface items, and adapts to feedback to improve its accuracy.

According to an aspect of the invention there is provided a control system for controlling a user interface of a vehicle, the control system comprising one or more controllers, the control system configured to:

obtain context information associated with use of the vehicle;

provide the context information to a dynamic decision model to determine a display location at which to display a user interface item on at least one of a plurality of driver-viewable displays at different locations relative to a front windscreen of the vehicle;

cause the user interface item to be displayed at the determined display location; and update the dynamic decision model in dependence on the context information and a determined user response to the display location of display of the user interface item.

An advantage is that the dynamic decision model adapts to the user's feedback, to enable the system to further reflect users preferences.

In some examples, the context information associated with use of the vehicle comprises journey information and/or environmental condition information. In some examples, the journey information comprises one or more of: a time; a phase of the journey; a location of the vehicle; a journey condition. In some examples, the context information associated with use of the vehicle comprises user state information.

In some examples, the dynamic decision model is configured to determine the display location in dependence on a plurality of modalities of the obtained context information. An advantage is improved accuracy and confidence that the determined context is correct.

In some examples, determining the display location comprises determining at which one of the plurality of driver-viewable displays to display the user interface item.

In some examples, the plurality of driver-viewable displays comprise two or more of: a dashboard display; an instrument cluster display; a head-up display.

In some examples, updating the dynamic decision model in dependence on the context information comprises updating the dynamic decision model based on a trend of context information obtained over a plurality of journeys. An advantage is enabling improved accuracy and confidence of the dynamic decision model.

In some examples, updating the dynamic decision model in dependence on the determined user response comprises updating the dynamic decision model based on a determined passive user response and/or based on a determined active user response, to the display location of the user interface item. Some examples of monitoring the user response advantageously ensure that the driver does not have to be involved to provide feedback to the dynamic decision model.

In some examples, the determined passive user response comprises ignoring of the user interface item and/or comprises a driver reaction to the display location of the user interface item, indicated by a driver reaction sensor.

In some examples, the determined active response comprises a human-machine interface input from the driver, the input comprising one or more of: movement of the user interface item away from the display location, dismissal of the user interface item, and/or acceptance of a prompt or other control of the user interface item.

In some examples, the user interface item relates to any one or more of: an HVAC (heating-ventilation and cooling) function of the vehicle; a seat comfort function; a navigation function of the vehicle; a driver instrument function of the vehicle; an infotainment function of the vehicle a communication event notification function; or an ADAS (advanced driver assistance system) function.

According to a further aspect of the invention there is provided a vehicle comprising the control system.

According to a further aspect of the invention there is provided a method of controlling a user interface of a vehicle, the method comprising:

obtaining context information associated with use of the vehicle;

providing the context information to a dynamic decision model to determine a display location at which to display a user interface item on at least one of a plurality of driver-viewable displays at different locations relative to a front windscreen of the vehicle;

causing the user interface item to be displayed at the determined display location; and updating the dynamic decision model in dependence on at least one of:

the context information; or a determined user response to the display location and/or timing of display of the user interface item.

According to a further aspect of the invention, the method updates the dynamic decision model in dependence on the context information and the determined user response.

According to a further aspect of the invention there is provided computer software that, when executed, is arranged to perform any one or more of the methods described herein. According to a further aspect of the invention there is provided a non-transitory computer readable medium comprising computer readable instructions that, when executed by a processor, cause performance of any one or more of the methods described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination that falls within the scope of the appended claims. That is, all embodiments and/or features of any embodiment can be combined in any way and/or combination that falls within the scope of the appended claims, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
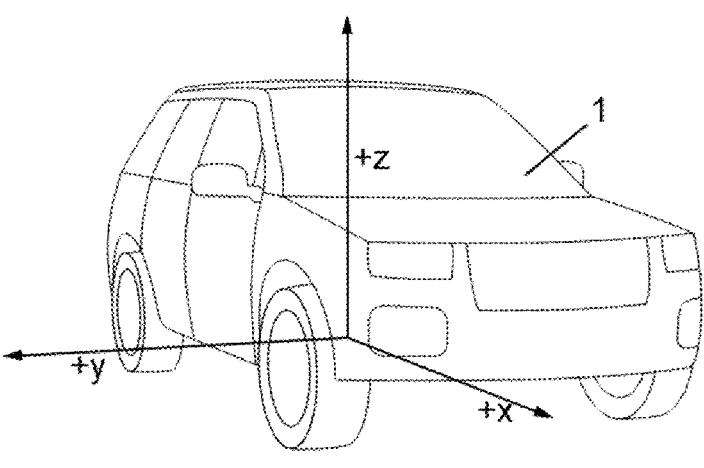
FIG. 1 illustrates an example of a vehicle.

FIG. 1 illustrates an example of a vehicle 1 in which embodiments of the invention can be implemented. In some, but not necessarily all examples, the vehicle 1 is a passenger vehicle, also referred to as a passenger car or as an automobile. In other examples, embodiments of the invention can be implemented for other applications, such as commercial vehicles.

FIG. 1 is a front perspective view and illustrates a longitudinal x-axis between the front and rear of the vehicle 1 representing a centreline, an orthogonal lateral y-axis between left and right lateral sides of the vehicle 1, and a vertical z-axis. A forward/fore direction typically faced by a driver's seat is in the positive x-direction; rearward/aft is –x. A rightward direction as seen from the driver's seat is in the positive y-direction; leftward is –y. These are a first lateral direction and a second lateral direction.

Figure 2:
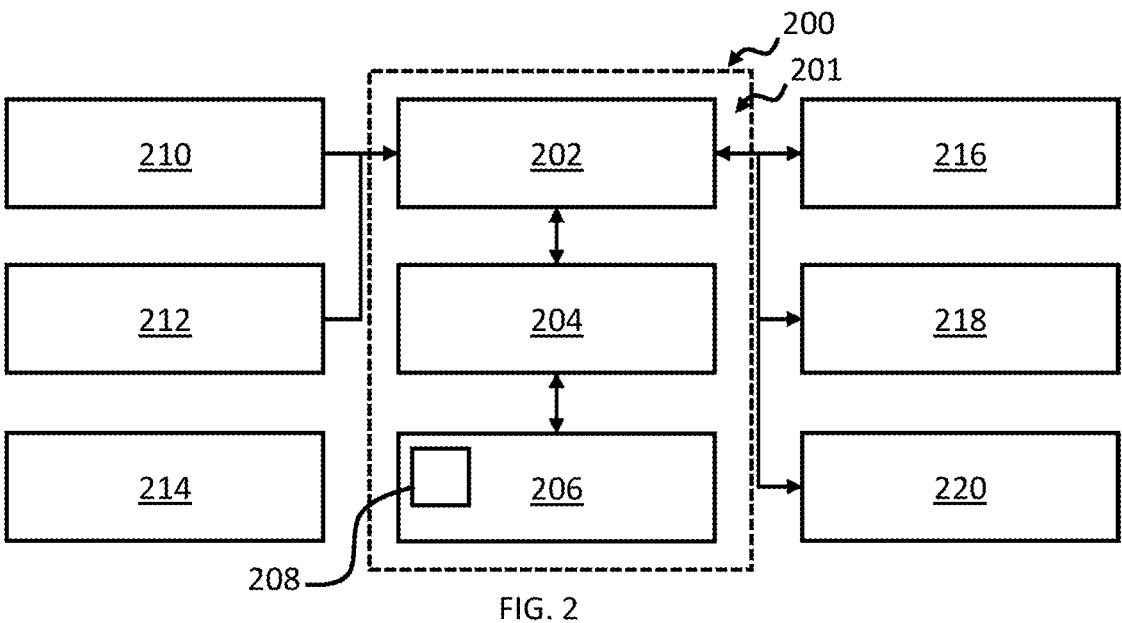
FIG. 2 illustrates an example of a control system.

FIG. 2 illustrates an example control system 200 configured to implement one or more aspects of the invention. The control system 200 of FIG. 2 comprises a controller 201. In other examples, the control system 200 may comprise a plurality of controllers on-board and/or off-board the vehicle 1.

Figure 3:
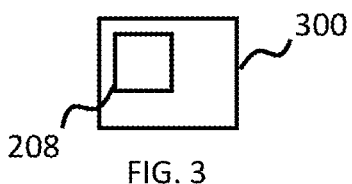
FIG. 3 illustrates an example of a non-transitory computer-readable storage medium.

The controller 201 of FIG. 2 includes at least one processor 204; and at least one memory device 206 electrically coupled to the electronic processor 204 and having instructions (e.g. a computer program 208) stored therein, the at least one memory device 206 and the instructions configured to, with the at least one processor 204, cause any one or more of the methods described herein to be performed. The processor 204 may have an interface 202 such as an electrical input/output I/O or electrical input for receiving information from various sources 210, 212 and interacting with external components 214, 216, 218. FIG. 3 illustrates a non-transitory computer-readable storage medium 300 comprising the instructions 208 (computer software).

As shown in FIG. 2 and FIGS. 5A-5C, the vehicle 1 can comprise a plurality of driver-viewable displays at different locations relative to a front windscreen of the vehicle 1. The displays include a centre console display 216, an instrument cluster display 218, and a head up display 220 (if configured for the vehicle 1). Further examples may include a further display under the centre console display, one or more steering wheel-mounted displays, etc. The displays may comprise touchscreen displays and/or switchgear-controlled displays.

The displays are at different locations in the front of the cabin of the vehicle, relative to a driving field of view. The driving field of view herein refers to the field of view through the front windscreen of the vehicle 1 from the driver eye position (i.e., the position of the driver's seat headrest). Some displays therefore require more driver's gaze deviation from the driving field of view than others. The head up display 220 is within the driving field of view, requiring no gaze deviation outside the driving field of view. The instrument cluster display 218 is below the head up display 220 and close to the driving field of view, requiring only a small vertical gaze deviation and no lateral gaze deviation. The centre console display 216 is a dashboard display, lower than the head up display 220 and mounted more centrally, on the dashboard between the driver and front passenger seats. The centre console display 216 therefore requires greater vertical and lateral gaze deviation.

As displays increasingly replace physical HMI switchgear and analogue instruments, there is an opportunity to manage the displayed user interface items, including controls (software switchgear and information related thereto) and information (messages/guidance), so that they are shown in the right display location (display or display position) and at the right time, to reduce gaze deviation.

However, illogically moving and showing certain user interface items could lead to frustration and/or confusion of the driver as they fail to locate controls on the multitude of displays in the vehicle 1. With traditional physical controls the user had a mental model of where controls are located and access to always-visible physical buttons/dials. Failing to move and show certain user interface items logically could lead to increased effort on the part of the user.

According to examples of the present disclosure, a dynamic decision model is proposed, to manage which user interface items are shown when and on which display, based on context information associated with use of the vehicle 1. The aim is for the driver to be more likely to find the user interface items they are trying to access for the given context at a given moment, with minimal gaze deviation. For example, the most appropriate user interface items can be displayed at a display closer to the driving field of view. In effect, the dynamic decision model is managing the driver's field of view.

The dynamic decision model utilises machine learning and/or rules-based decision models to adapt a set of context rules for managing when and where user interface items are displayed. The dynamic decision model may firstly comprise a driver routine feedback loop to learn a driver's routine of use of each user interface item based on the time, location and other context information in which the user interface item is used. This enables the user interface items to be adapted to the current context of use of the vehicle 1. Further, in at least some examples, the dynamic decision model comprises a second, driver response feedback loop determining the driver's response to the display location adaptations.

In an example use case, when free-flowing traffic changes to stop-start traffic, user interface items relating to low-speed queue assistance migrate to or appear on the instrument cluster display 218 or head up display 220, whereas navigation instructions migrate to the centre console display 216, further from the driving field of view. When free-flowing traffic resumes, the previous user interface item arrangement is restored.

User interface items (e.g., controls/information) that can benefit from the dynamic decision model described herein include, but are not limited to user interface items associated with one or more of the following functions of the vehicle 1:

An HVAC function.

Example controls and information: temperature setpoint, intensity setpoint, air-conditioning, auto-intensity mode; zone-independence, demisting, which vents to use, recirculation.

A seat comfort function.

Example controls and information: seat heating setpoint, seat cooling setpoint, seat massage setpoint.

A navigation function.

Example controls and information: navigation history, navigation search.

Example information: navigation instructions (displayed map and route instructions), traffic information.

A driver instrument function.

Example controls and information: vehicle speed, powertrain-dependent information (e.g., traction battery state of charge, driving range, selected gear, engine speed, powertrain load).

An infotainment function.

Example controls and information: media application such as music, radio, podcast or video application; personal organiser application such as a calendar; news application, a user profile selection interface (to confirm who the user is and therefore which stored settings/configurations to execute).

A communication event notification function.

Example information: incoming voice or video call notification, incoming text message notification (e.g., SMS or other), incoming social media notification.

An ADAS function.

Example controls and/or information: omnidirectional view (e.g., birds-eye view) of vehicle (captured by vehicle surround cameras), reverse/backup camera view, blind spot camera view, night vision display, wading depth information, terrain information.

The context information associated with use of the vehicle 1, for the dynamic decision model, can come from various sources. The dynamic decision model may be multimodal, relying upon a plurality of modalities of context information to make an inference. FIG. 2 illustrates an example of three classes of sources connected as inputs to the control system 200. Each class of sources of contextual information has a subset of multiple types of context information.

The first source of context information is a navigation system 210 of the vehicle 1. The context information is indicative of navigational use of the vehicle 1. This enables useful inferences about when and where the user typically uses the above-described functions. The context information can comprise journey information such as:

a phase of a journey, such as whether the vehicle 1 is at a start, middle or end of the journey.

a location of the vehicle 1 such as a current vehicle location.

a journey condition, such as one or more of: a type of road that the vehicle 1 is travelling along; a speed of the vehicle 1; current traffic conditions currently affecting the speed of the vehicle 1 (e.g., congestion and/or roadworks); whether a navigation destination is set; an identity of a navigation destination or waypoint of a programmed navigation route.

a time, which can be used for example to indicate whether the vehicle 1 is currently being used in the daytime or at night, and/or whether the vehicle 1 is being used on a weekday or weekend. Time may be an independent variable of the feedback loops.

The second source of context information is a set of one or more occupant sensors 212. The context information is indicative of use of the vehicle 1, and includes for example information about the driver and optionally includes information about whether the driver is accompanied. Information from the occupant sensors 212 can indicate one or more of: how many occupants are in the vehicle 1; an identity associated with an occupant (such as the driver); or user state information such as driver attention level and/or emotion (e.g., facial expression) and/or whether a user is asleep. An imaging sensor such as a cabin-facing/driver-facing camera can act as an occupant sensor 212 to indicate any of the above types of information. Additionally, or alternatively, an identity can be inferred by establishing a connection to a personal device (key or mobile phone) to determine a user's (connected) account, or detecting a user profile selection via HMI. Additionally, or alternatively, occupancy of a seat (without identity) can be determined by any one or more of seatbelt sensors, seat weight sensors, door ajar sensors, or the like.

The third source of context information associated with use of the vehicle 1 is a set of one or more environmental condition sensors 214 for providing environmental condition information indicative of the climactic condition in which the vehicle 1 is being used (driven). This can include weather information, for example, such as temperature information inside and/or outside the cabin (e.g., from a temperature sensor), or precipitation information (e.g., from a windscreen wiper status/rain sensor).

Figure 4:
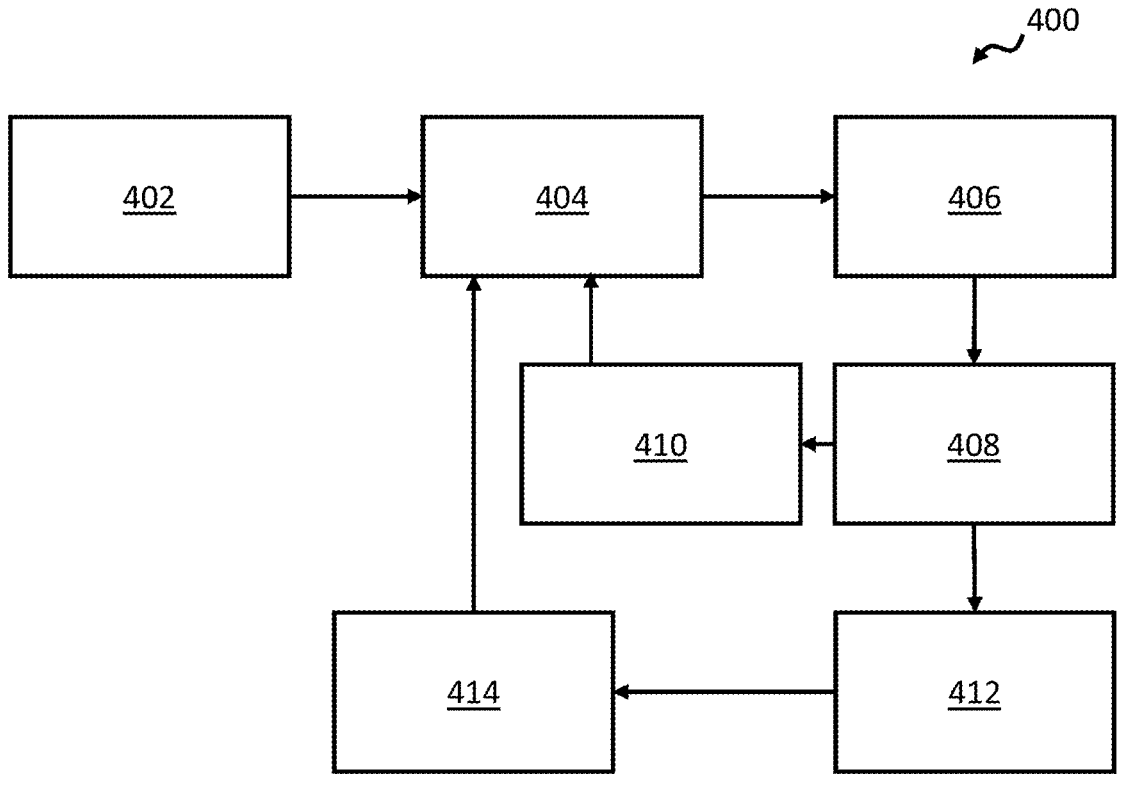
FIG. 4 illustrates an example of a method.

FIG. 4 illustrates an example method 400 for executing the dynamic decision model. The method 400 is computer-implemented, and may be executed by the control system 200. The method 400 is performed in relation to any one or more of the functions listed above, and could be applied to other functions not explicitly mentioned above.

At block 402, the method 400 comprises obtaining context information associated with use of the vehicle 1. The context information may be as described in the above examples.

The obtained context information may comprise a plurality of modalities of context information. The modalities may include context information from at least some of the classes described above (e.g., journey information, occupant sensor information, environmental condition information). The modalities may include different types of context information within a class, examples of which are listed above (e.g., phase of journey, time, journey condition).

The method 400 may obtain all of the available modalities of context information that are required by the dynamic decision model for making a context inference. For example, if the dynamic decision model was trained by machine learning, the method 400 may obtain the modalities of context information that the dynamic decision model was trained on.

Since the dynamic decision model is dynamic, new context information may be substantially continuously obtained and provided to the dynamic decision model to enable the dynamic decision model to react to an evolving context throughout a journey.

In an example use case of block 402, one of the user interface items controlled by the dynamic decision model is associated with a seat comfort function of the vehicle 1. Block 402 of the method 400 may obtain at least some of the following modalities of context information correlated (via feedback loops) with a routine of use: temperature information; journey information such as the location of the vehicle 1; and the current time.

Block 402 provides the obtained context information to block 404 of the method 400. Block 404 comprises executing the dynamic decision model. The dynamic decision model uses the context information to determine a display location at which to display the or each user interface item associated with the or each function. The dynamic decision model may be user-specific or user-agnostic, depending on the implementation. If user-specific, each user profile or user's (connected) account stored in a memory may have a separate dynamic decision model.

Using the context information, the dynamic decision model may be configured to determine one or more of the following display characteristics of the user interface item: which one or more of the displays to initiate display of the user interface item; whether to cease displaying the (currently displayed) user interface item; a local display position of the user interface item within a (large) display; whether to duplicate at least a portion of the user interface item across different ones of the displays.

For example, the dynamic decision model can change the display location of the user interface item by migrating the user interface item to another display. The migration can comprise ceasing displaying the user interface item on a first display, and commencing displaying the user interface item on a second display.

In some examples, further display characteristics can be controlled, such as changing the magnitude of the user interface item to make a control easier or harder to actuate on a touchscreen display.

Optionally, the dynamic decision model may further include predetermined rules or heuristics, that may not be updated by feedback. For example, exceedance of a maximum temperature threshold may prevent upwards migration or display of a seat heating function, even if the other context information suggests that the seat heating function is routinely used at a particular time/location.

Another example of a predetermined rule comprises operating state information (whether a function is currently active or inactive) of one or more of the functions listed above. For example, if an HVAC function is switched off, then upwards migration or display of an HVAC user interface item may be prevented, even if the other context information suggests that the HVAC function is routinely used at a particular time/location.

Once the display location has been determined, and any other characteristics, the method 400 proceeds to block 406 which comprises managing the content displayed on one or more displays as determined by block 404. This causes the or each user interface item to be rearranged or rendered to be displayed at the or the respective determined display location. If some user interface items are to be removed, then block 406 may also cease display of determined user interface items that the dynamic decision model determined are not appropriate for the given context information.

Figure 5A:
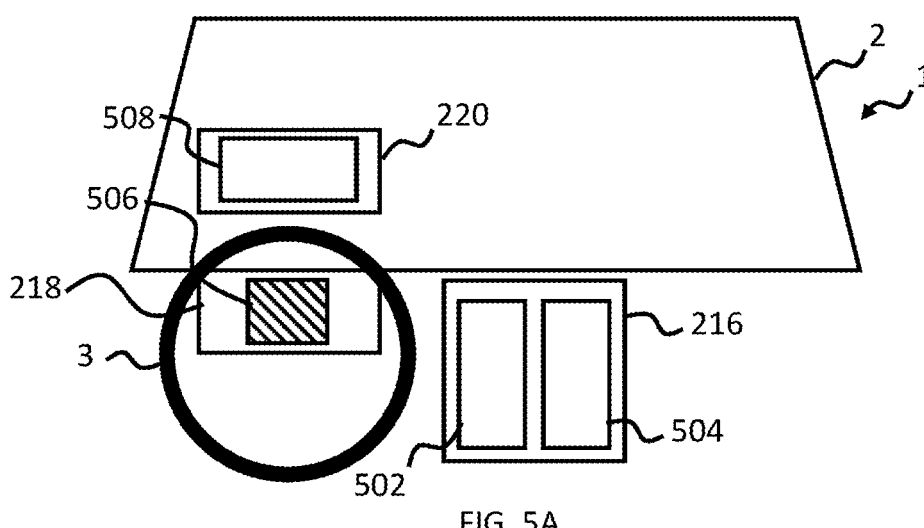
FIGS. 5A, 5B, 5C illustrate an example of migration of user interface items between displays in different contexts.
Figure 5B:
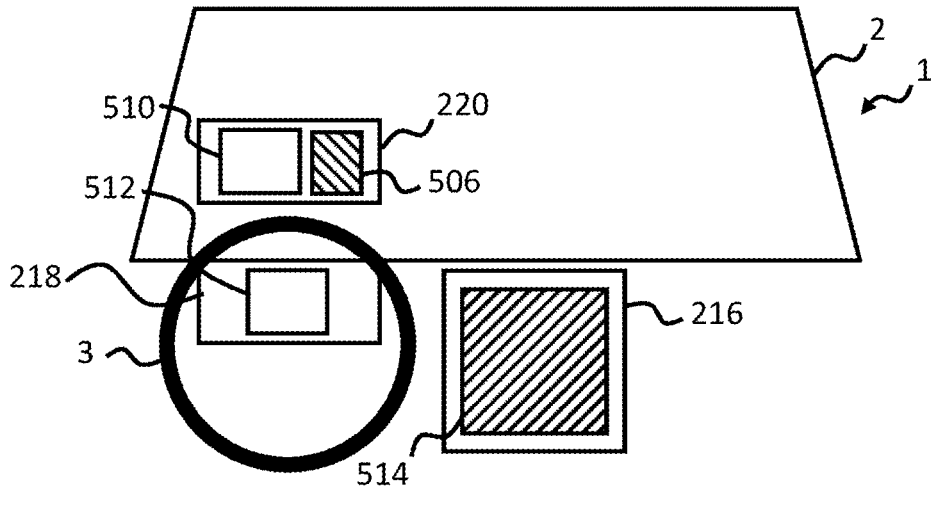
Figure 5C:
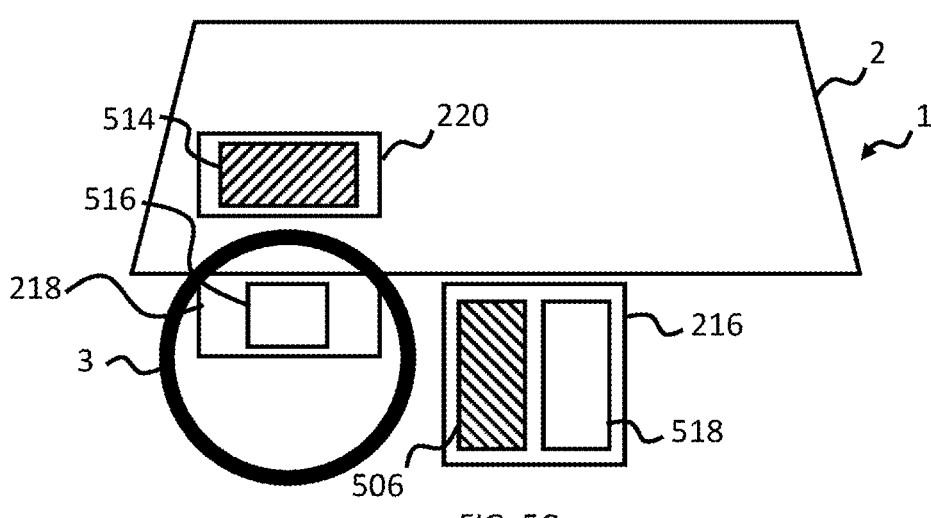

FIGS. 5A-5C illustrate an example non-limiting implementation, showing the centre console display 216, instrument cluster display 218 and head up display 220, with user interface items schematically located thereon. A front windscreen 2 and steering wheel 3 are also visible.

In FIG. 5A, the context information indicates that a journey is at a start phase. For example, the vehicle 1 may be stationary and no navigation destination may yet be set. In FIG. 5B, the context information indicates that the vehicle 1 is in a travelling phase of the journey, and is moving. In FIG. 5C, the context information indicates that the vehicle 1 is still in the travelling phase of the journey but is stopped due to traffic conditions.

In FIG. 5A, the dynamic decision model has caused the following user interface items to be displayed on the following displays, based on the above context information (journey start):

navigation search 502, on the centre console display 216;
 user profile selection interface 504, on the centre console display 216;
 vehicle speed 506, on the instrument cluster display 218; and
 navigation history 508, on the head up display 220.

This assists the driver in setting up a navigation route and loading their configurations and settings.

In FIG. 5B, the dynamic decision model has caused the following changes in which user interface items are displayed and at which display locations, based on the context information (journey underway, vehicle moving):

media application 514 newly displayed, on the centre console display 216;
 ADAS information 512 newly displayed, on the instrument cluster display 218;
 vehicle speed 506 migrated up to the head up display 220; and
 navigation route 510, on the head up display 220 (i.e., the previous navigation user interface item updated when a destination was set, and migrated upwards).

This assists the driver in following a navigation route while obeying speed limits, without deviating their gaze from the driving field of view.

In FIG. 5C, the dynamic decision model has caused the following changes in which user interface items are displayed and at which display locations, based on the context information (journey underway, but stopped in traffic):

vehicle speed 506 migrated down to the centre console display 216;

media application 514 migrated up to the head up display 220;

traffic information 516 newly displayed, on the instrument cluster display 218; and seat massage control 518 newly displayed, on the centre console display 216.

This assists the driver in accessing the functions that they routinely use when stuck in traffic (e.g., media/infotainment), without deviating their gaze from the driving field of view far or for very long. This can also provide access to controls which previously the driver would have to search for in a system menu structure. For example, some information previously only accessible from a lower-level menu, at a high 'click-depth', may now be rendered automatically.

The illustrated example is one of many possible examples. For example, if the time or environmental condition information indicates winter/cold weather, and the driver routinely uses seat heating in cold weather, then the dynamic decision model may display a seat heating function at a prominent, higher display location at the beginning of the journey.

In some examples, the dynamic decision model can be further adapted to control audio functions. For example, the dynamic decision model may be configured to automatically disable a voice function (e.g., communication event notification function) in dependence on an occupant sensor 212 indicating that a passenger is asleep (e.g., via facial expression detection).

The method 400 then comprises two feedback loops for updating the dynamic decision model. These include a driver reaction feedback loop (blocks 408-410) and a driver routine feedback loop (blocks 412-414). The driver reaction feedback loop is to indicate whether the new (e.g., migrated) display location of a user interface item is better or worse at assisting the driver. The driver routine feedback loop is to adapt to changes of the driver's routine of use of the vehicle 1, to maintain consistency as routines evolve.

If the dynamic decision model comprises a machine learning model, the feedback loops can be regarded as reinforcement learning feedback loops.

At block 408, the driver reaction feedback loop comprises determining a user response to the display location of display of a user interface item. At block 410, the method 400 updates the dynamic decision model in dependence on the determined user response. The user response may be the driver's response.

Inaction by the driver may be determined by the dynamic decision model as positive feedback accepting the new display location of the user interface item. Acceptance may act as positive feedback to reward the decision of block 404, for example by updating model weights applied to the modalities of context information.

However, if the driver rejects the new display location or expresses detectable disapproval, the dynamic decision model may determine this as negative feedback to penalise the new display location decision of block 404, for example by updating the model weights applied to the modalities of context information.

One technique for determining the driver response is to detect an active user response. The active user response comprises an HMI input from the driver.

One example of an active user response for providing negative feedback is user-initiated movement of the user interface item away from the new display location, to another display location or the previous display location.

Another example of an active user response for providing negative feedback is dismissal of the user interface item.

Dismissing the user interface item may be a command to stop rendering the user interface item, for example by changing the rendered screen to a different one.

An example of an active user response for providing positive feedback is explicit acceptance in response to a rendered feedback prompt, or unprompted feedback (via a menu) if a prompt would be too intrusive.

Another technique for determining the driver response is to detect a passive user response. The passive user response does not comprise an HMI input from the driver.

An example of a passive user response for providing positive feedback is detecting inaction by the driver, as mentioned above.

An example of a passive user response for providing either positive or negative feedback is detecting a driver reaction via a non-contact driver reaction sensor (occupant sensor). One example of a driver reaction sensor is a driver-facing camera configured to detect head pose and/or gaze direction and/or facial expression. Another example of a driver reaction sensor is a microphone coupled to a speech recognition engine, to detect positive or negative spoken feedback.

The driver response feedback loop may rely upon sensor information for measuring how efficiently driving and non-driving tasks are completed before and after the user interface items have been adapted to the context. For example, the control system 200 may use information as eye tracking from a driver-facing camera or steering entropy (how many steering corrections are being made) to help the control system 200 to determine if the HMI changes it makes have the effect of reducing (or increasing) the mental effort of driving the vehicle 1. The control system 200 aims to reduce the driver's effort in modifying the system.

In order to avoid false positives or false negatives, block 408 may be timed to detect feedback for a limited time after the change of display location of the user interface item. This ensures that the driver's action or inaction occurs while the context is substantially the same as when the decision was made to change the display location, therefore, the driver is reacting to the new display location of the user interface item rather than to something else. A time limit could be selected from the range 5 seconds to one minute. The time limit may be a variable based on one or more of: the determined type of user interface item, the context information, the environmental condition information, or the determined intensity of the driving task—such as navigating a junction, heavy traffic or poor weather conditions.

The driver routine feedback loop comprises, at block 412, monitoring the context information over a plurality of journeys (drive cycles) of the vehicle 1, including the current journey. At block 414, the method 400 updates the dynamic decision model in dependence on the monitored context information from block 412.

More specifically, the dynamic decision model is updated based on a trend of the context information obtained over the plurality of journeys. This enables a routine to be parameterised by the dynamic decision model, such as a routine of activating heated or cooled seats at certain times and/or locations and/or journey phases.

The value of each measurand (e.g., state, temperature, vehicle speed, vehicle location, . . . ) of the or each modality of context information may be determined in response to detecting the user interacting with a user interface item. This may repeat one or more times per journey. This builds up the routine of when/where/how/why the user interacts with the function associated with the or each user interface item. If the user interface item comprises a control, detecting interaction may comprise detecting a user input applied to the control. If the user interface item is information-only, detecting interaction with the information may comprise detecting the tracked driver's gaze direction (via occupant sensor) intersecting the determined location of the user interface item, and/or detecting the user dismissing the information by 'closing the window' or navigating to a different/previous screen.

As shown in FIG. 4, block 412 may be linked to the output of block 408 to depend on whether the quicker access to the functions provided by block 406 were desired.

In a machine learning implementation, the trend may be parameterised by the model weights of each neuron of the hidden layer(s) of a neural network. However, it would be appreciated that the dynamic decision model could be a different type of model, such as a Bayesian decision tree defining a statistical model which may also be updated based on statistics from this driver routine feedback loop.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

Machine learning as described herein includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

It will be appreciated that various changes and modifications can be made to the present invention without departing from the scope of the present application.

The blocks illustrated in FIG. 4 may represent steps in a method and/or sections of code in the computer program 208. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for controlling a user interface of a vehicle, the control system comprising one or more controllers, the control system configured to:
    obtain context information associated with use of the vehicle;
    provide the context information to a dynamic decision model to determine a display location at which to display a user interface item, on at least one of a plurality of driver-viewable displays at different locations relative to a front windscreen of the vehicle;
    cause the user interface item to be displayed at the determined display location; and
    update the dynamic decision model in dependence on the context information and a determined user response to the display location of display of the user interface item,
    wherein the update of the dynamic decision model comprises use of sensor information to measure how efficiently driving or non-driving tasks are completed before and after the user interface items have been adapted to the context information.

2. The control system of claim 1, wherein the context information associated with use of the vehicle comprises journey information and/or environmental condition information, the journey information comprises one or more of: a time; a phase of the journey; a location of the vehicle; a journey condition, and the context information is associated with use of the vehicle comprises user state information.

3. The control system of claim 1, wherein the dynamic decision model is configured to determine the display location in dependence on a plurality of modalities of the obtained context information.

4. The control system of claim 1, wherein determining the display location comprises determining at which one of the plurality of driver-viewable displays to display the user interface item.

5. The control system of claim 1, wherein the plurality of driver-viewable displays comprise two or more of: a dashboard display; an instrument cluster display; a head-up display.

6. The control system of claim 1, wherein updating the dynamic decision model in dependence on the context information comprises updating the dynamic decision model based on a trend of context information obtained over a plurality of journeys.

7. The control system of claim 1, wherein updating the dynamic decision model in dependence on the determined user response comprises updating the dynamic decision model based on a determined passive user response and/or based on a determined active user response, to the display location of the user interface item.

8. The control system of claim 7, wherein the determined passive user response comprises ignoring of the user interface item and/or comprises a driver reaction to the display location of the user interface item, indicated by a driver reaction sensor.

9. The control system of claim 7, wherein the determined active response comprises a human-machine interface input from the driver, the input comprising one or more of: movement of the user interface item away from the display location, dismissal of the user interface item, and/or acceptance of a prompt or other control of the user interface item.

10. The control system of claim 1, wherein the user interface item relates to any one or more of:

an HVAC, heating-ventilation and cooling, function of the vehicle;

a seat comfort function;

a navigation function of the vehicle;

a driver instrument function of the vehicle;

an infotainment function of the vehicle a communication event notification function; or an ADAS, advanced driver assistance system, function.

11. The control system of claim 1, wherein the dynamic decision model comprises a drive routine feedback loop to learn a driver's routine of use of each user interface item based on the time, location, or other context information in which the user interface item is used, and a driver response feedback loop determining the driver's response to the display location adaption.

12. The control system of claim 1, wherein the context information at least includes driver gaze direction data from eye-tracking detected by a driver-facing camera, and the determined user response is at least based upon detection of the driver gaze direction intersecting the display location of display of the user interface item.

13. A vehicle comprising a user interface, a front windscreen, and a control system for controlling the user interface, the control system comprising one or more controllers, the control system configured to:

obtain context information associated with use of the vehicle;

provide the context information to a dynamic decision model to determine a display location at which to display a user interface item, on at least one of a plurality of driver-viewable displays at different locations relative to the front windscreen of the vehicle;

cause the user interface item to be displayed at the determined display location; and update the dynamic decision model in dependence on the context information and a determined user response to the display location of display of the user interface item, the update of the dynamic decision model comprises use of sensor information to measure how efficiently driving or non-driving tasks are completed before and after the user interface items have been adapted to the context information.

14. The vehicle of claim 13, wherein the context information associated with use of the vehicle comprises journey information and/or environmental condition information.

15. The vehicle of claim 14, wherein the journey information comprises one or more of: a time; a phase of the journey; a location of the vehicle; a journey condition.

16. The vehicle of claim 13, wherein the context information associated with use of the vehicle comprises user state information.

17. The vehicle of claim 13, wherein the dynamic decision model is configured to determine the display location in dependence on a plurality of modalities of the obtained context information.

18. The vehicle of claim 13, wherein determining the display location comprises determining at which one of the plurality of driver-viewable displays to display the user interface item.

19. A method of controlling a user interface of a vehicle, the method comprising:

obtaining context information associated with use of the vehicle;

providing the context information to a dynamic decision model to determine a display location at which to display a user interface item on at least one of a plurality of driver-viewable displays at different locations relative to a front windscreen of the vehicle;

causing the user interface item to be displayed at the determined display location; and updating the dynamic decision model in dependence on the context information and a determined user response to the display location of display of the user interface item, wherein the updating of the dynamic decision model comprises using of sensor information to measure how efficiently driving or non-driving tasks are completed before and after the user interface items have been adapted to the context information.

20. A computer program product embodied on a non-transitory computer readable medium, comprising computer code that, when executed by a computer, causes the computer to perform a method according to claim 19.

* * * * *